United States Patent Office 3,222,713
Patented Dec. 14, 1965

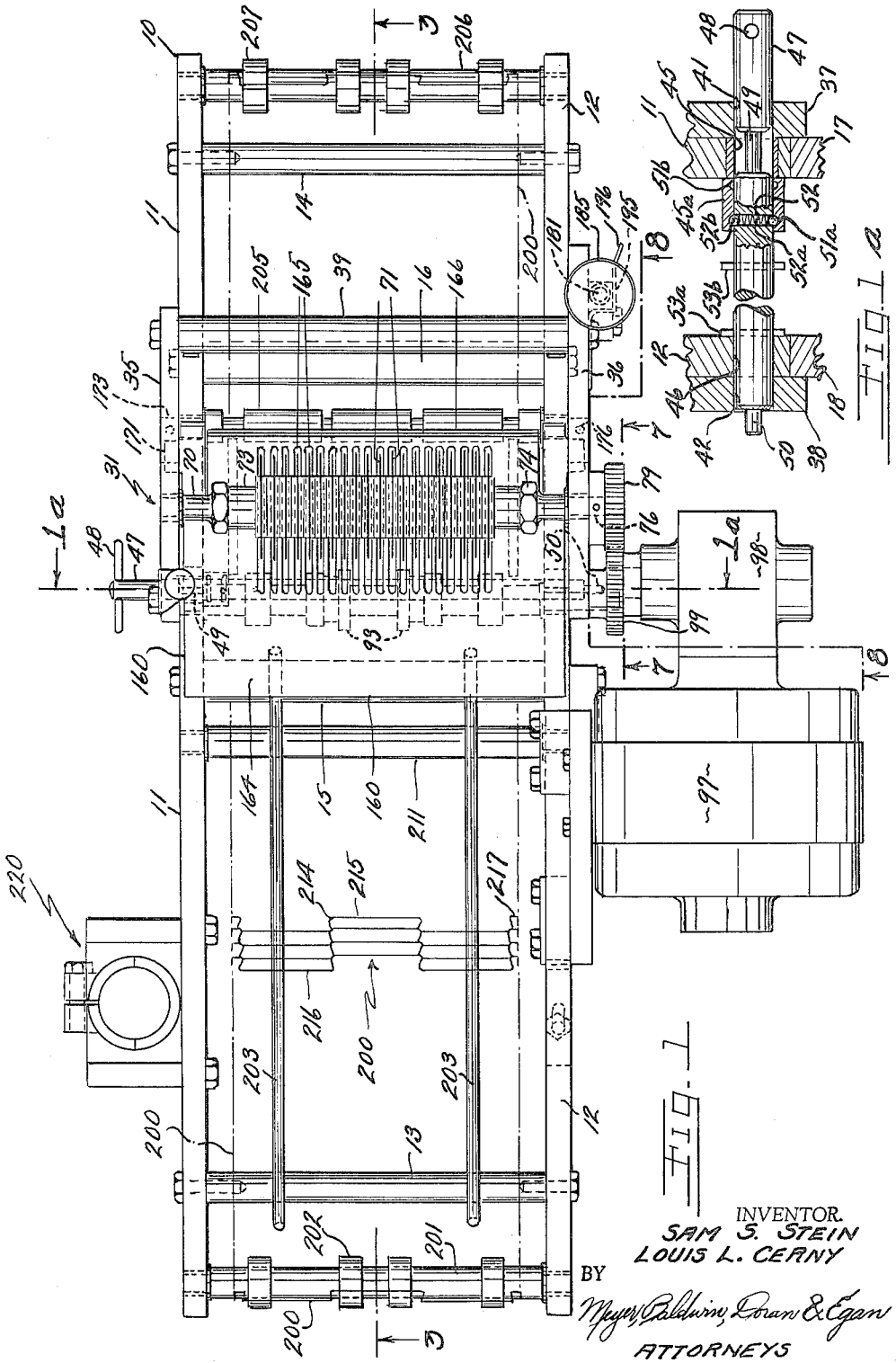

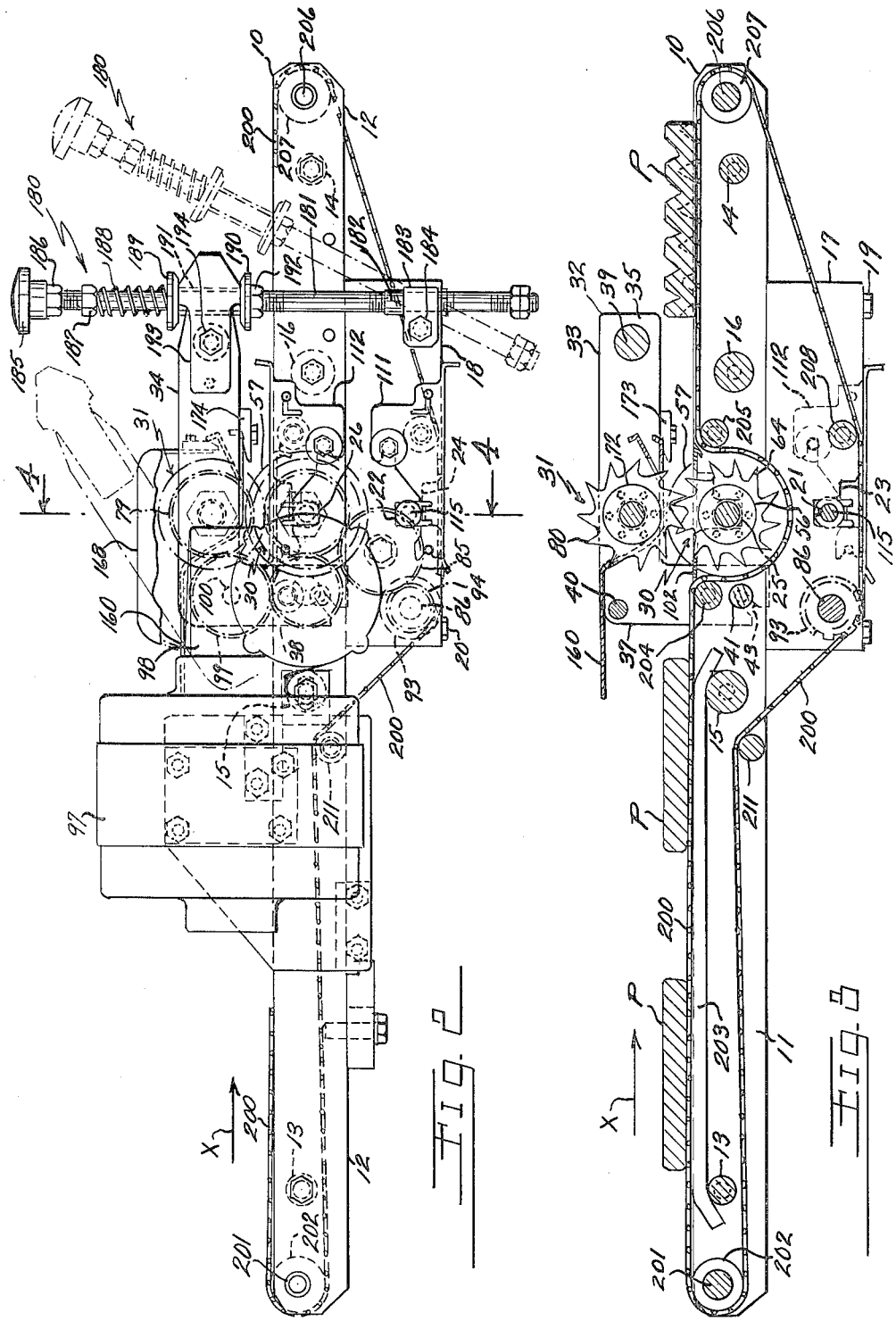

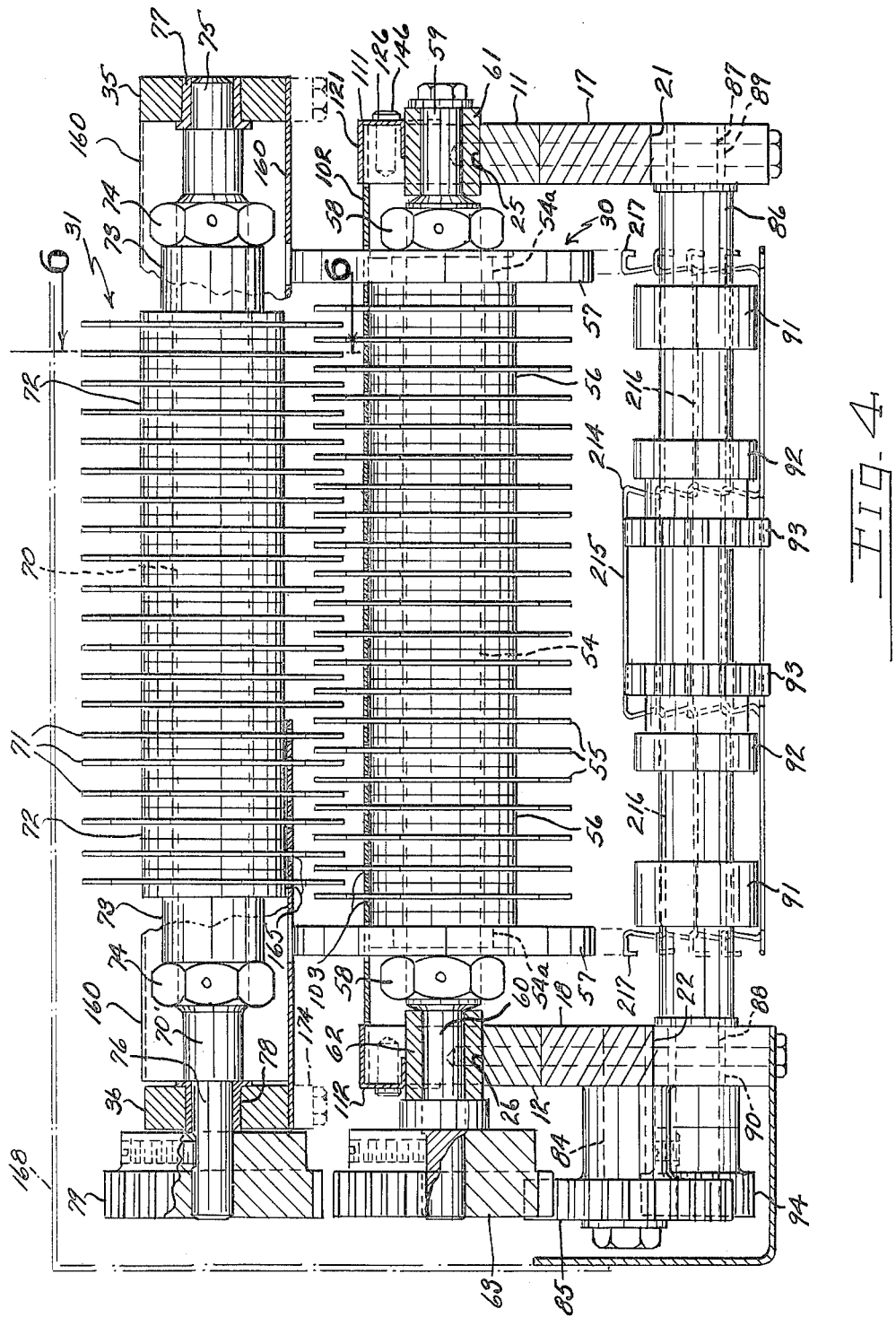

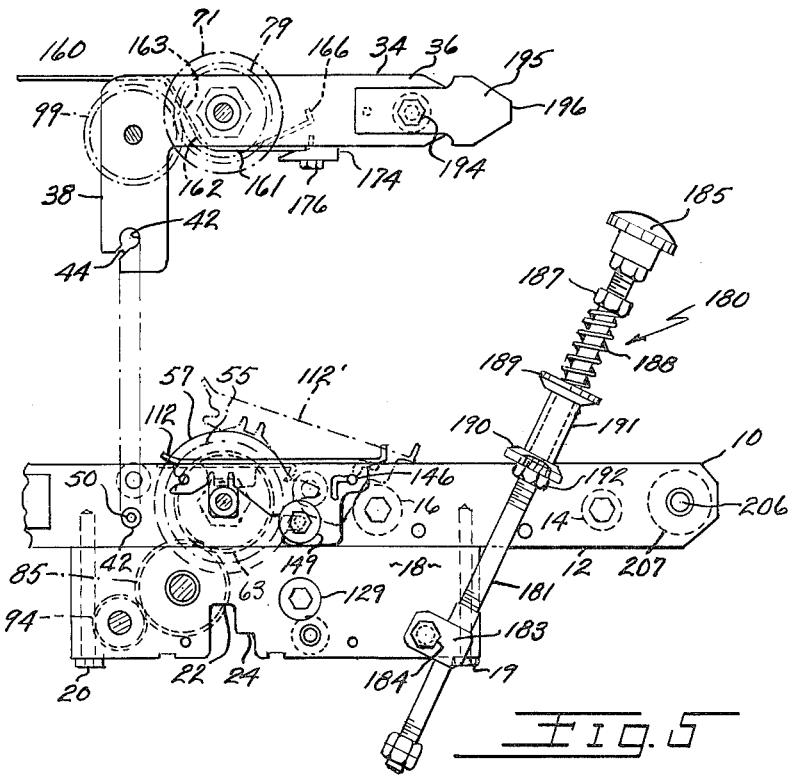
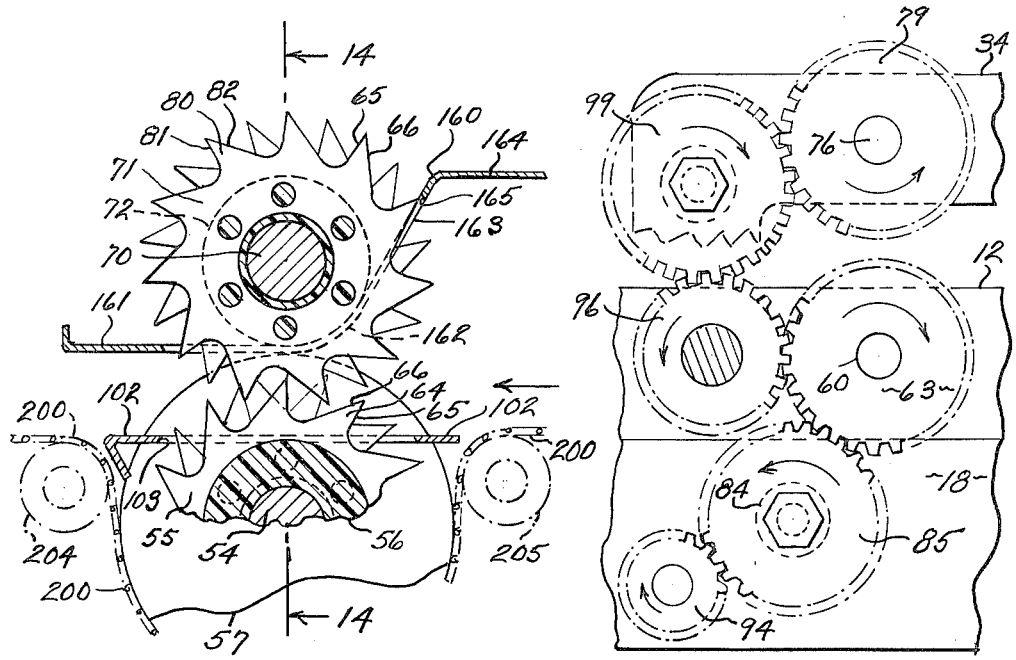

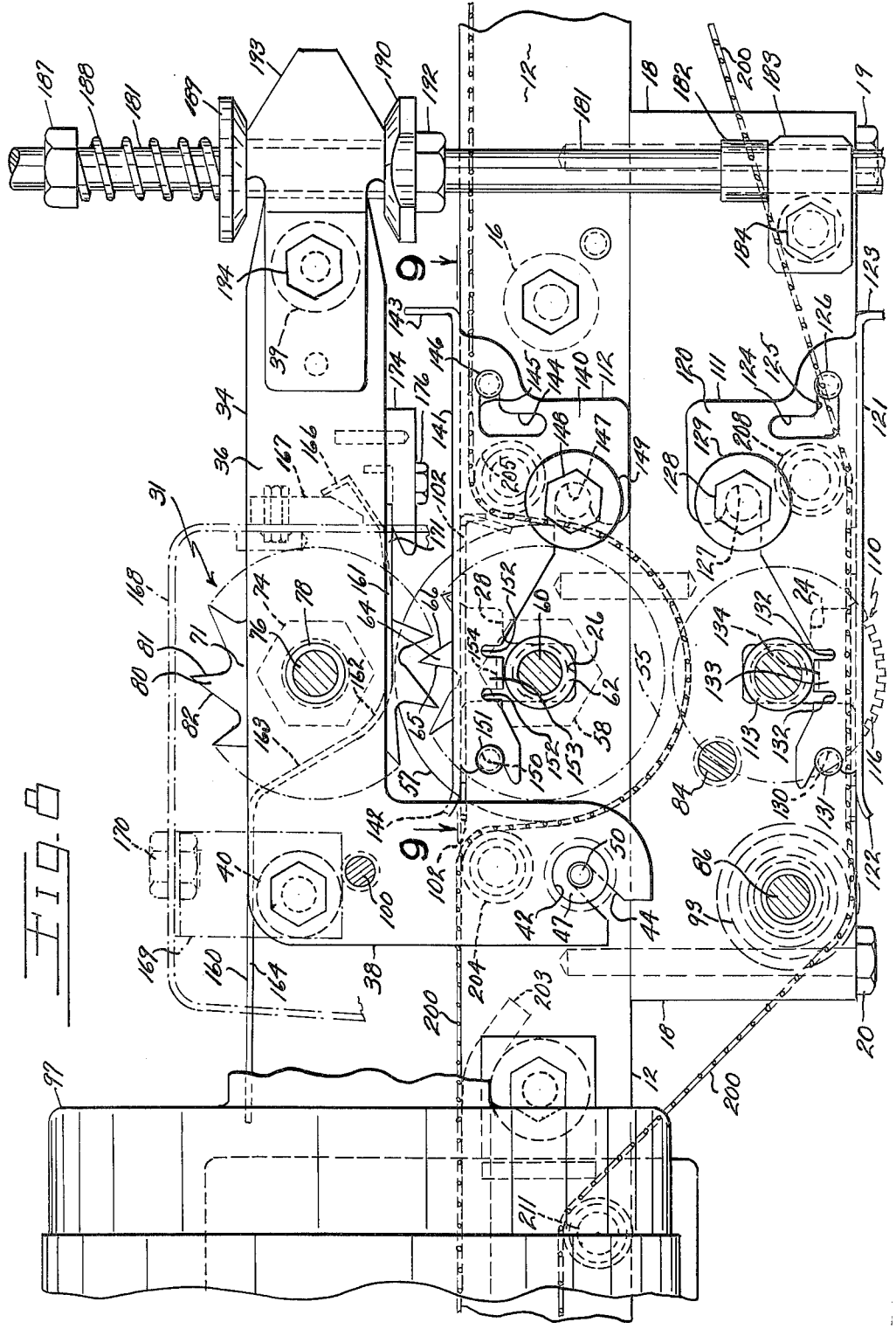

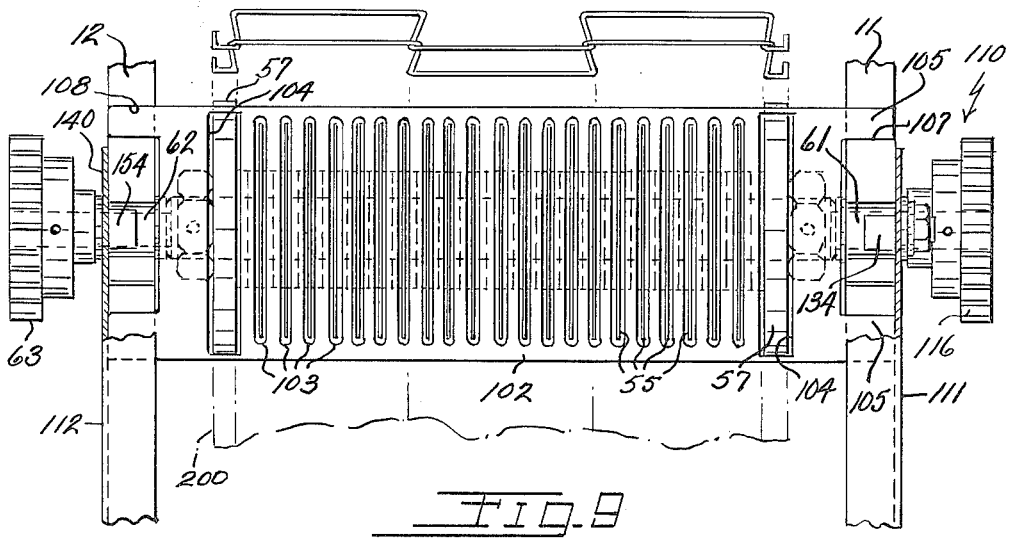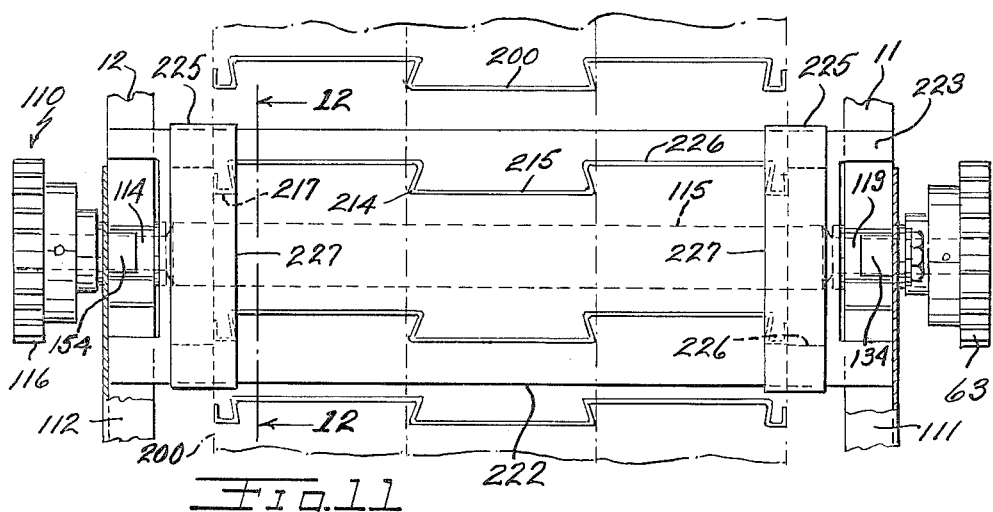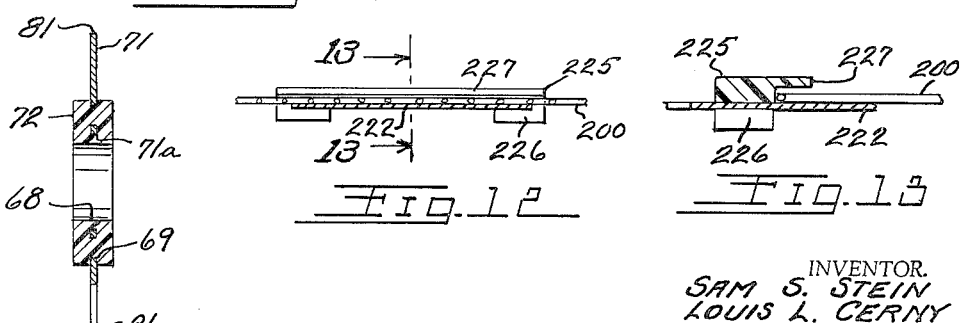

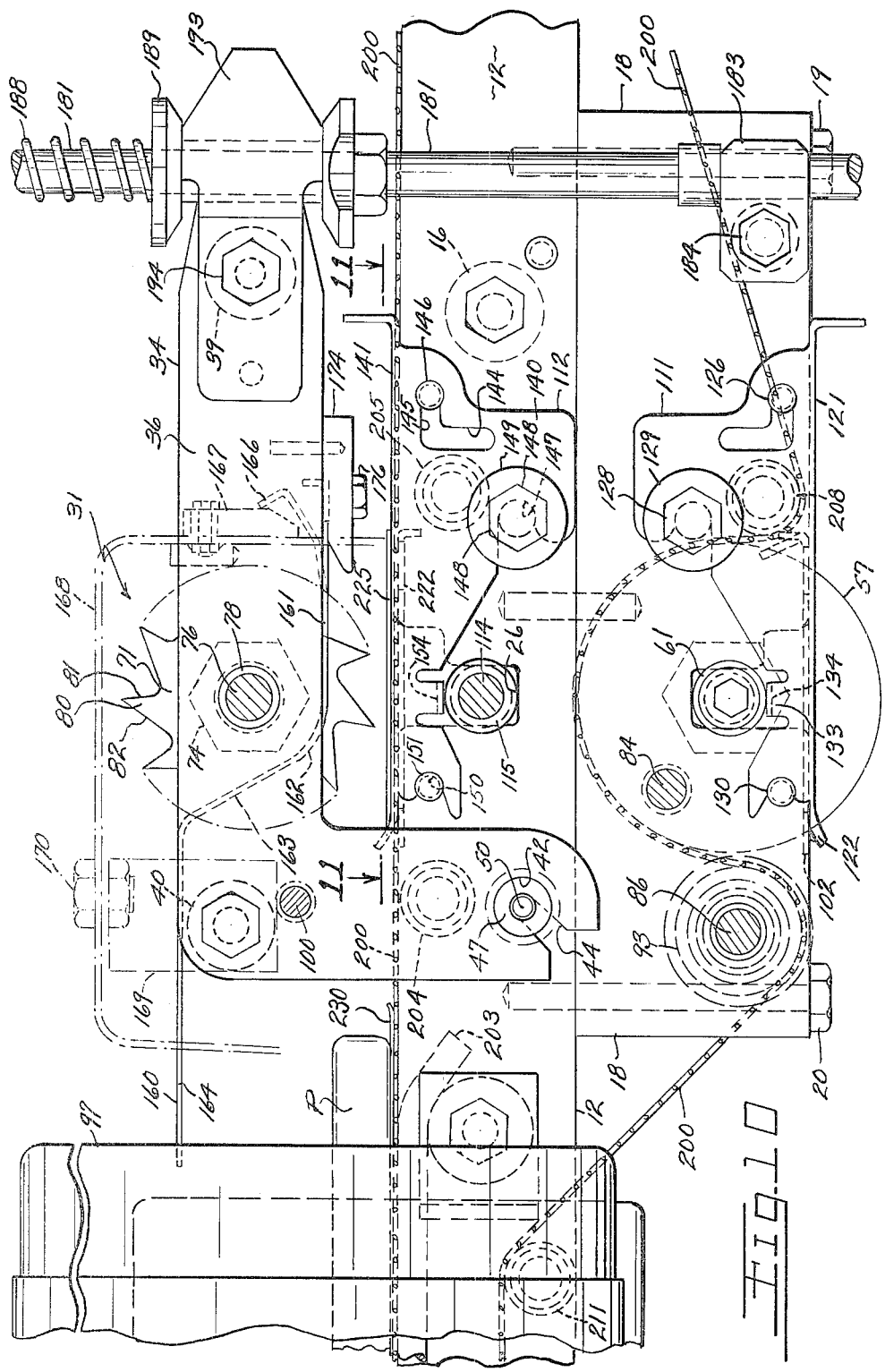

3,222,713
MEAT SCORING MACHINE
Sam S. Stein, Sandusky, and Louis L. Cerny, Cleveland, Ohio, assignors to Sam Stein Associates Inc., Sandusky, Ohio, a corporation of Ohio
Filed Aug. 10, 1964, Ser. No. 388,483
14 Claims. (Cl. 17—26)

This invention relates generally to food processing machines and, more particularly, to a machine for scoring a meat product such as a patty of compressed, ground meat.

In general, the machine of the present invention comprises an endless belt conveyor assembly which is adapted to convey a meat patty horizontally either between a pair of upper and lower scoring blade assemblies or beneath an upper scoring blade assembly only whereby either both or only one side of the patty is provided with a multiplicity of nonperforating indentations. Suitable motor and gear means are provided for continuously driving the conveyor and the scoring blade assemblies. Each blade assembly is provided with a plurality of toothed scoring blades. Said blades are generally circular with the teeth radiating therefrom whereby rotary motion of each said scoring blade assembly causes the teeth to repeatedly and successively engage the meat patty as it passes along the conveyor belt. When both an upper and lower scoring blade assembly are used, the blades of each assembly are staggered relative to the blades of the other assembly whereby the scoring pattern on the top of the meat patty is offset from a like scoring pattern on the bottom of said patty. The blade assemblies are set in such manner that the teeth of the respective scoring blades overlap but do not completely pierce or perforate the meat patty from either side thereof. Means are provided for quickly and easily converting the meat scoring machine of this invention from one adapted to score both sides of a meat patty to one adapted to score one side only without changing the length of the conveyor belt and with only a minimum rearrangement of the parts.

It is, therefore, an object of this invention to provide a meat processing machine for scoring or providing nonperforating indentations in one or both of the surfaces of a meat product.

Another object of this invention is to provide a meat scoring machine which can be used on conjunction with a meat patty forming machine whereby a multiplicity of newly formed meat patties are automatically scored.

Another object of the invention is to provide such a machine with a minimum of parts which may be quickly disassembled for cleaning.

Still another object of the invention is to provide a meat scoring machine as set forth above whereby the depth of penetration of the teeth of the scoring blades is quickly and easily adjustable without disassembly of the machine.

Other objects of the invention and many of its features will be clearly understood from the following description of one embodiment of the invention as disclosed in the accompanying drawings in which, FIG. 1 is a top plan view of the meat scoring machine of this invention;

FIG. 1a is an enlarged section taken along the line 1a—1a of FIG. 1;

FIG. 2 is a side elevation of the meat scoring machine of this invention;

FIG. 3 is a longitudinal section through the machine taken generally along the line 3—3 of FIG. 1;

FIG. 4 is an enlarged section taken generally along the line 4—4 of FIG. 2;

FIG. 5 is an exploded view in side elevation showing the manner in which the top scoring frame is removed;

FIG. 6 is an enlarged detail of scoring blades taken generally along the line 6—6 of FIG. 4;

FIG. 7 is a section taken generally along the line 7—7 of FIG. 1 showing the gear train for driving the conveyor belt and the upper and lower scoring blade assemblies;

FIG. 8 is an enlarged section taken generally along the line 8—8 of FIG. 1 showing the scoring machine of this invention adapted for scoring meat patties on both sides;

FIG. 9 is a section taken generally along the line 9—9 of FIG. 8;

FIG. 10 is a view similar to FIG. 8 showing the scoring machine of this invention adapted to score the upper side only of a meat patty;

FIG. 11 is a section taken generally along the line 11—11 of FIG. 10;

FIG. 12 is a section taken along the line 12—12 of FIG. 11;

FIG. 13 is a section taken along the line 13—13 of FIG. 12; and

FIG. 14 is a section taken generally along the line 14—14 of FIG. 6 showing one of the scoring blades in section.

The meat scoring machine illustrated in the accompanying drawings may be made of suitable metal alloys such as steel or other metals conventionally used in the manufacture of gears, shafts, framing and the like. The meat scoring blades themselves are preferably made from stainless steel while bushings, rollers and sprockets may be made of suitable plastics. It will be understood by those skilled in the art that the materials of construction may vary somewhat according to various well known uses of currently available materials.

Referring now particularly to FIGS. 1-3, the meat scoring machine of this invention is constructed around a horizontally disposed, elongated main frame 10 comprising elongated, parallel spaced side frame members 11 and 12 which are connected together adjacent to their ends by a pair of end tie rods 13 and 14 and intermediate their ends by intermediate tie rods 15 and 16. The end tie rods 13 and 14 are spaced inwardly from the ends of the side frame members 11 and 12, and the intermediate tie rods 15 and 16 are spaced inwardly from the end tie rods, the tie rod 15 being disposed substantially midway between the end tie rods, and the tie rod 16 being disposed intermediate the tie rod 15 and the end tie rod 14. All of said tie rods serve to rigidly connect the side frame members 11 and 12 together and maintain said frame members in their spaced relationship.

The side frame members 11 and 12 carry auxiliary frame members 17 and 18 respectively which are secured edgewise to the bottom surfaces of said side frame members in any suitable manner such as by bolts 19 and 20. The auxiliary frame members are disposed intermediate the ends of the elongated side frame members somewhat closer to the right-hand end of the main frame as illustrated in FIGS. 1-3, said right-hand end being hereinafter referred to as the rearward end of said main frame. Said auxiliary frame members 17 and 18 are of the same thickness and are coplanar with the side frame members 11 and 12 respectively and project downwardly therefrom a substantial distance. The auxiliary frame member 17 has an L-shaped notch in its lower edge comprising a deep bearing recess 21 and a rearwardly stepped, relatively more shallow clearance recess 23. The auxiliary frame member 18 is similarly provided with an L-shaped notch comprising a deep bearing recess 22 and a rearwardly stepped, relatively shallower clearance recess 24. Immediately above the L-shaped notches, in the auxiliary frame members 17 and 18, are inverted, mirror image L-shaped notches in the side frame members 11 and 12 respectively, the L-shaped notch in the side frame member 11 comprising bearing recess 25 and clearance recess 27 and the L-shaped notch in side frame member 12 comprising bearing recess 26 and clearance recess 28. The bearing recesses 25 and 26 of the side frame members 11 and 12 respectively support a lower scoring blade assembly, generally indicated at 30 in FIG. 3, which said assembly is disposed intermediate the intermediate tie rods 15 and 16.

An upper scoring blade assembly, generally shown at 31 in FIG. 3, is carried immediately above the lower scoring blade assembly by a pivot frame 32. Said pivot frame comprises L-shaped frame members 33 and 34 carried on the outer sides of the side frame members 11 and 12 respectively. The longer arm of the frame member 33, shown at 35, is disposed generally horizontally above the level of the side frame member 11 with its distal end projecting rearwardly. The shorter arm of the frame member 33, shown at 37, is disposed generally vertically with its distal end portion downwardly overlapping the outer side of the side frame member 11 and disposed beyond the scoring blade assemblies in the direction of the end tie rod 13, hereinafter referred to as the forward end of the main frame 10. The L-shaped frame member 34 is similarly provided with a generally horizontal, longer arm 36 and a vertical, shorter arm 38 which downwardly overlaps the outer surface of the side frame member 12. The distal end portions of the longer arms 35 and 36 are rigidly connected together across the main frame 10 by a tie rod spacer 39, and the proximal ends of said longer arms, where they intersect the shorter arms 37 and 38, are connected together by a tie rod spacer 40. The distal end of the shorter arm 37 of the frame member 33 is apertured at 41 for pivoting said frame member, said distal end portion also having a forwardly and downwardly obliquely directed notch 43 intersecting said aperture 41. As best shown in FIG. 5, the lower or distal end portion of the shorter arm 38 of the frame member 34 is similarly provided with a pivot aperture 42 and an oblique, intersecting notch 44.

Means are provided for pivotally and detachably mounting the pivot frame 32 to the main frame 10 (FIG. 1a). The side frame members 11 and 12 are coaxially apertured at 45 and 46 respectively, the aperture 45 being slightly larger and having a detent bushing 45a securely fitted therein. The aperture 46 and the bore of the bushing 45a have the same diameter and are adapted to slidably receive the normal diameter of a pivot shaft 47. Said pivot shaft has a handle 48 at an end portion thereof which projects beyond the side frame member 11 whereby it is adapted for manually operable endwise movement. The normal diameter of the pivot shaft 47 also slidably interfits the apertures 41 and 42 of the shorter arms 37 and 38, said pivot shaft being provided with diametrically reduced portions 49 and 50 which are so disposed that when said pivot shaft is pulled by the handle 48, said reduced portions are moved into alignment with the apertures 41 and 42. The reduced portions are sufficiently small to pass through the notches 43 and 44 whereby, with the handle 48 pulled, the pivot frame 32 can be lifted off of the pivot shaft 47.

The detent bushing 45a projects inwardly from the side frame member 11 and has two axially spaced, internal circumferential grooves 51a and 51b. A diametric bore is provided at 52 in the pivot shaft 47, said bore containing a coil spring 52a and a pair of detent balls 52b which said spring biases outwardly toward the grooves 51a and 51b. By pulling longitudinally on said pivot shaft, the detent balls 52b can be snapped from the groove 51a as illustrated to the groove 51b, and by pushing on said pivot shaft in the opposite direction, said detent balls can be snapped back into the groove 51a. The pivot shaft 47 carries a pair of radially projecting pins 53a and 53b adjacent to the side frame members 12 and 11 respectively for limiting the extent of longitudinal movement of said pivot shaft whereby the detent balls cannot be moved beyond the pair of grooves 51a and 51b.

From the foregoing, it will be seen that with the detent balls 52a and 52b disposed in the groove 51a, the normal diameter of the pivot shaft 47 is disposed in the apertures 41 and 42 to prevent removal of the pivot frame 32 and that when said detent balls are moved to the groove 51b. the reduced portions 49 and 50 are aligned with the notches 43 and 44 whereby said pivot frame can be removed.

FIG. 4 shows the relationship between the lower scoring blade assembly 30 and the upper scoring blade assembly 31 when the pivot frame 32 is in the full line position of FIG. 2 and the scoring machine is adapted for scoring both the upper and lower surfaces of a meat patty. The lower scoring blade assembly 30 comprises an arbor 54 upon which are mounted a plurality of rotary blades 55 having hubs 56 serving to space them apart. The blades 55 are interposed between belt guide rollers 57 adjacent to the ends of said arbor. The belt guide rollers 57 are freely rotatable in either direction about the arbor 54 by means of flanged retainer bearings 54a, and the entire assembly of blades and rollers is secured together by end nuts 58. The arbor 54 has reduced end portions 59 and 60 projecting beyond the end nuts 58 and carrying bushings 61 and 62 respectively which are seated within the bearing recesses 25 and 26 of the side frame members 11 and 12. The reduced end portion 60 extends outwardly beyond the bushing 62 and carries a gear 63 at its distal end.

As detailed in FIG. 6, each rotary blade 55 has a plurality or circumferentially evenly spaced, generally radiating scoring teeth 64 which are each shaped somewhat like the end of a knife blade to facilitate penetration of the meat product. Each tooth 64 has a generally radially disposed, back edge 65 and an outwardly tapered front edge 66 which said front edge first contacts the meat product during rotation. The rotary motion of the blades causes the teeth to penetrate the meat product with a drawing, slicing action which terminates with the root portion of the teeth being first withdrawn while the points are drawn almost straight up out of the patty. As herein illustrated, the blades 55 are preferably made of relatively thin stainless steel substantially .037" thick.

The upper scoring blade assembly 31 is similar in construction to the lower scoring blade assembly and comprises an arbor 70 carrying a plurality of rotary blades 71 having separating hubs 72 and being sandwiched between end spacers 73 and end nuts 74. The ends of the arbor 70 are provided with reduced portions 75 and 76 which are journalled by bushings 77 and 78 in suitable apertures in the longer arms 35 and 36 respectively. The reduced portion 76 extends outwardly beyond the bushing 78 and carries on its distal end a gear 79 which is coplanar with but which is spaced above and does not mesh with the gear 63 of the lower scoring blade assembly 30. The rotary blades 71 are identical in form with the rotary blades 55, each blade having a plurality of circumferentially evenly spaced, knife-like scoring teeth 80 defined by radiating back edges 81 and tapered front edges 82.

It has been found that scoring teeth of the disclosed shape and thinness are preferable where it is especially desired not to distort or widen the meat patty. However, the teeth can be made thicker and less tapered where some lateral distortion is desired. The hubs 56 and 72 of the rotary blades 55 and 71 respectively may comprise individual spacers, may be integrally formed with said blades, or may be formed of a suitable plastic and molded and/or bonded to the blade. Also, said blades may be made of metal other than stainless steel or a suitable rigid plastic if desired.

Referring now to FIGS. 6 and 14, a preferred form of scoring blade is disclosed wherein the hubs 72 are integrally formed of a suitable plastic and are molded to the blade 71 in interlocking relation therewith. The blade 71 is provided with a plurality of circumferentially spaced apertures 69 which are disposed adjacent to an inner peripheral edge 71a of the blade, which said edge defines a central opening through the blade. The plastic forming the hubs 72 extends diametrically beyond the apertures 69 and itself provides a central aperture 68 which is coaxial with the opening defined by the edge 71a. The aperture 68 is of a smaller diameter than the opening through the blade 71 whereby the plastic completely encases said inner, peripheral edge. By particular reference to FIG. 14, it will be readily seen that the hubs 72 comprise a single, doughnut-shaped piece of plastic which extends symmetrically on either side of the blade and which said plastic extends through the apertures 69 and inwardly around the inner peripheral edge 71a.

By referring to FIG. 4, it will be noted that the circumferential sweep of the rotary blades 55 and 71 overlap, but they are so spaced along their associated arbors that each rotary blade of one arbor is interposed between but spaced from adjacent pairs of rotary blades of the other arbor. As shown in FIG. 6, the rotary blades in each scoring blade assembly are alternately angularly displaced substantially one-half the circumferential distance between the teeth.

FIG. 4 further discloses an idler gear 85 which is carried by a shaft 84 of the auxiliary frame member 18 generally below and slightly forwardly of the gear 63 of the lower scoring blade assembly 30. Said idler gear 85 meshes with the gear 63 and is thereby driven by the lower scoring blade assembly 30.

The auxiliary frame members 17 and 18 also carry a belt drive shaft 86 (FIGS. 3 and 4) having reduced end portions 87 and 88 journalled in said auxiliary frame members by bushings 89 and 90 respectively. The belt drive shaft 86 carries outer and inner belt guide collars 91 and 92 and a pair of belt drive sprockets 93 which are integral with said collars 92, said sprockets being spaced from each other along the belt drive shaft and interposed between said inner belt guide collars. The reduced end portion 88 extends outwardly beyond the bushing 90 and carries at its distal end a belt drive pinion 94 which meshes with the idler gear 85.

FIG. 7 discloses the relationship of the above discussed gear train comprising the gear 79 of the upper scoring blade assembly 31, the gear 63 of the lower scoring blade assembly 30, the idler gear 85 carried by the auxiliary frame member 18, and the pinion 94 of the belt drive shaft 86. To complete the gear train, there is provided a drive gear 96 of a motor 97 and attached gear box 98 which said motor and gear box are secured in any suitable manner to the sidef rame member 12. The drive gear 96 meshes with and directly drives the gear 63 of the lower scoring blade assembly 30 and indirectly drives the gear 79 of the upper scoring blade assembly 31 through a reversing gear 99, said reversing gear being carried by the L-shaped frame member 34 upon a shaft 100 thereof (FIGS. 2, 8 and 10). The directions of rotation of the various gears of the train, as the meat scoring machine is oriented in FIGS. 2 and 3, are indicated by appropriate arrows as follows: drive gear 96 rotates counterclockwise, reversing gear 99 rotates clockwise, the upper arbor gear 79 rotates counterclockwise, the lower arbor gear 63 rotates clockwise, idler gear 85 rotates counterclockwise, and belt drive pinion 94 rotates clockwise.

Referring now particularly to FIGS. 8 and 9, the scoring teeth 64 of the lower rotary blades 55 pass upwardly above the upper surfaces of the side frame members 11 and 12 through a lower stripper plate 102 which is bridged across between said side frame members and is provided with a plurality of narrow slots 103 through which the scoring teeth of the lower rotary blades project. Relatively wider slots 104 are provided in the stripper plate 102 in alignment with the belt guide rollers 57 whereby said rollers also project upwardly above said stripper plate. The stripper plate 102 is provided with end tabs 105 which project transversely of the machine from the sides of said stripper plate and are seated in suitable notches 107 and 108 in the upper surfaces of the side frame members 11 and 12 respectively.

The lower scoring blade assembly 30 and the lower stripper plate 102 are held in their respective positions by a pair of retainer clips 111 and 112 (FIG. 4). Said retainer clips 111 and 112 are mirror images of each other and identical clips are used in the inverted position on opposite sides of the scoring machine at the auxiliary frame members 18 and 17 respectively to retain an idler gear shaft assembly 110 seated within the bearing recesses 21 and 22 (FIG. 8). Thus, it will be understood that a retainer clip of the type shown at 111 in FIG. 8 in the inverted position is used at the opposite side of the main frame 10 to retain the bushing 61 in the same manner that the bushing 62 is shown retained by the retainer clip 112. The retainer clips 111 and 112 as associated with the auxiliary frame members 18 and 17 respectively specifically retain bushings 113 and 114 disposed at the ends of a shaft 115 of the idler gear shaft assembly 110 (FIG. 11). The idler gear shaft assembly 110 carries an idler gear 116 at the end thereof beyond the bushing 114 which said gear is positioned beyond one side of the machine during the setup for one type of operation and at the other side of the machine during the setup for another type of operation, all of which will be hereinlater fully disclosed. In the setup being presently described with reference to FIG. 8, the idler gear 116 is disposed beyond the side of the machine which is away from the viewer or, in other words, beyond the side frame member 11. This disposes the bushing 113 within the nearest bearing recess 22 of the auxiliary frame member 18.

Referring again to FIG. 8, the retainer clip 111 is formed from substantially heavy sheet metal and comprises a vertically disposed body portion 120, which lies flatwise against the outer surface of the auxiliary frame member 18, and a horizontal lip 121 which is disposed flatwise against the lower surface of said auxiliary frame member 18. It will be understood that a retainer clip 111 positioned on the opposite side of the machine (see FIG. 4) is disposed with its body portion 120 flatwise against the outer surface of the side frame member 11 and its lip 121 disposed against the upper edge of said side frame member 11. An end portion of the lip 121 which is directed toward the forward end of the machine and indicated at 122 is bent slightly away from the adjacent bottom edge surface of the auxiliary frame member 18. The opposite or rearwardly directed end of said lip has a right angularly bent grip portion 123 which is also turned away from the auxiliary frame member. The grip portion 123 is for grasping the retainer for sliding motion parallel with the bottom surface of the auxiliary frame member 18, and the turned or bent portion 122 is for aiding in lifting and pivoting the clip as well as to facilitate movement of same over end tabs 105 (and end tabs 223 to be hereinlater described).

The body portion 120 has an L-shape slot comprising right angularly disposed, vertically and horizontally directed slot portions 124 and 125. The slot portions 124 and 125 are adapted to slidably engage a headed pin 126 which is carried by the auxiliary frame member 18. In the area where the slot portions 124 and 125 merge, the L-shape slot affords an opening sufficient to allow the removal of the body portion 120 from engagement with the headed pin 126. Said body portion extends away from the lip 121 beyond the L-shape slot and is there provided with a notch 127 which opens in a forward direction and engages the shank of a bolt 128 which is also carried by the auxiliary frame member 18. The bolt 128 carries an enlarged washer 129 which overlies a substantial portion of the body portion 120 whereby when said bolt is tightened, said body portion and the entire retainer clip are held firmly in place.

The body portion 120 narrows toward the lip 121 in a forward direction with the extreme forward end of said body portion being provided with a second notch 130 which also opens forwardly and which said notch engages a headed pin 131 carried by the auxiliary frame member 18. Intermediate the two notches 127 and 130, said body portion has two vertical slots 132 defining an L-shape lug 133, said lug having an inwardly turned foot portion 134 which bears against the bushing 113 of the idler gear assembly 110.

The retainer clip 112, as hereinabove stated, is a mirror image of the retainer clip 111. In other words, if the retainer clip 111 be considered as a right-hand clip, then the retainer clip 112 would be a left-hand clip of exactly the same kind. Said retainer clip 112 has a body portion 140 disposed flatwise against the outside surface of the side frame member 12 and a horizontal lip 141 which is disposed flatwise against the upper edge of said frame member 12. It will be understood that a retainer clip 112 is similarly secured with its body portion flatwise againts the outside surface of the auxiliary frame member 17 with its lip 141 being disposed flatwise against the lower edge surface of said auxiliary frame member 17. The latter mentioned clip 112 holds the opposite bushing 114 within the bearing recess 21 (not shown in FIG. 8).

The retainer clip 112 has a turned up portion 142 at its forward end and a right angularly disposed grip portion 143 at its rearward end. An L-shape slot is provided comprising vertical and horizontal slot portions 144 and 145 which are adapted to engage a headed pin 146. A first forwardly open notch is provided at 147 which engages the shank of a bolt 148 carrying a washer 149. A second notch 150 is provided at the forward end of the body portion which said notch 150 engages a headed pin 151 carried by the side frame member 12. Vertical slots 152 define an L-shape lug 153 having an inturned foot portion 154 which retains the bushing 62 within the bearing recess 26.

Manipulation of any of the clips 111 and 112 will be readily understood by the following description of the manipulation of the clip 112, illustrated in FIG. 8, and by reference to the exploded view, FIG. 5. When it is desired to remove the lower scoring blade assembly 30, the bolt 148 is loosened and the clip 112 is slid rearwardly by grasping the grip portion 143. This movement disposes the headed pin 146 in the forward end of the slot portion 145, disengages the notch 147 from the bolt 148, moves the foot portion 154 of the lug 153 back into the clearance recess 28, and disengages the notch 150 from the headed pin 151. The clip is then moved upwardly to dispose the pin 146 in the bottom end of the slot portion 144 whereby the lip 141 is spaced upwardly above the side frame member 12. The clip 112 is then tilted in a clockwise direction to the dotted line position 112' as seen in FIG. 5 to allow removal of the upper scoring blade assembly bushing 62 from the bearing recess 26. It will be readily understood that the retainer clip 111 (FIG. 4) on the opposite side frame member 11 is similarly manipulated to release the bushing 61. It will also be readily understood that the idler gear shaft assembly 110 is removable in a similar manner by a similar manipulation of the inverted retainer clips 111 and 112 carried by the auxiliary frame members 17 and 18. Any clip may be completely removed by moving it rearwardly, until a pin 126 or 146 is disposed at the vertex of a pair of slot positions 124–125 or 144–145, and then laterally outwardly whereby it slips off of its associated headed pin 126 or 146.

The upper scoring blade assembly 31 is also provided with a stripper plate 160 which is disposed between and carried by the longer arms 35 and 36 of the L-shape frame members 33 and 34 respectively. The stripper plate 160 is made of sheet metal and comprises a horizontal lower portion 161 which is disposed partially beneath the upper scoring blade assembly 31 and which projects rearwardly therebeyond, a curved portion 162 which curves upwardly and forwardly around the hubs 72, an upwardly and forwardly oblique portion 163 which extends upwardly generally to the upper edges of the arms 35 and 36, and an upper horizontal portion 164 which extends over the tie rod spacer 40 and projects forwardly therebeyond. The lower horizontal portion 161, the curved portion 162 and the oblique portion 163 afford elongated, narrow slots 165 (FIGS. 1 and 4) through which the scoring teeth 80 of the rotary blades 71 project. The rearwardly directed end of the lower portion 161 has an upwardly obliquely angled foot portion 166 which is hooked behind a pair of locators 167 which are, in turn, carried by a protective housing or cover 168 disposed over the blade. The cover 168 is carried by the pivot frame 32 in any suitable manner such as by a bracket 169 having a nut and bolt assembly 170. The locators 167 locate the stripper plate 160 in its proper, rearmost position thereby assuring that the protective cover will be in place prior to use of the machine. The lower portion 161 carries transversely directed ears or tabs 171 which project laterally beneath the longer arms 35 and 36 and are secured in place by retainers 173 (FIG. 3) and 174 (FIG. 2) which are secured to the arms 35 and 36 respectively by bolts 175 and 176.

The pivot frame 32 and, therefore, the upper scoring blade assembly 31 are maintained in the full line position shown in FIGS. 2, 3 and 8 by an adjusting rod assembly generally indicated at 180 in FIG. 2. Said adjusting rod assembly comprises an elongated adjusting screw 181 having a permanently fixed stop 182 spaced upwardly a substantial distance below its lowermost end. The adjusting screw 181 is thread fitted within a pivot block 183 which is pivotally secured to the outer surface of the auxiliary frame member 18 adjacent to its lowermost and rearwardly directed corner by means of a bolt and sleeve assembly 184. The adjusting screw 181 extends downwardly a substantial distance below the auxiliary frame members and upwardly a substantial distance above the pivot frame 32. The upper end of said adjusting screw carries a knob 185 secured in place by a lock nut 186. Spaced downwardly from the lock nut 186 is a spring tension nut 187 which bears against a coil spring 188 which said spring is, in turn, disposed against a top adjusting disk 189. A threaded bottom adjusting disk 190 is disposed in spaced relation to the top adjusting disk 189 by an interposed sleeve 191 which is telescoped over the adjusting screw 181. The threaded bottom adjusting disk 190 is held in position by a lock nut 192.

Referring now particularly to FIGS. 1 and 2, the adjusting rod assembly 180 engages the distal end portion of the longer arm 36 of the L-shape frame member 34. Said longer arm 36 projects rearwardly farther than the opposite longer arm 35 and carries on its outer side near its distal end a retaining clip 193 which is secured thereto by a bolt 194. As seen from above in FIG. 1, the retaining clip 193 is stepped laterally outwardly at 195 and has a rearwardly projecting end portion 196 which is angled outwardly even farther. As seen from the side in FIG. 2, the stepped portion 195 and the angled portion 196 provide an arrowhead shaped engaging member which is pointed in the rearward direction, and the distal end portion of the arm 36 is similarly arrowhead shaped. The pivot frame 32 is engaged by the adjusting rod assembly 180 by pivoting said assembly to the vertical position whereby the retaining clip 193 and the distal end portion of the arm 36 engage between the adjusting disks 189 and 190. This, in turn, determines the position of the upper scoring blade assembly 31 in relation to the lower scoring blade assembly 30. The tension nut 187 adjustably determines the tension on the top adjusting disk 189 by the coil spring 188, and said coil spring allows limited resilient upward movement of the pivot frame 32. The adjusting nut 192 affords means for lowering or raising the adjustment of the pivot frame within limits allowable by the size of the teeth of the meshing gears 79, 99 and 96. The stop 182 positively limits the downward position of the adjusting screw 181 but allows adjustment upwardly therefrom by rotating the knob 185.

For removal of the pivot frame in the manner hereinbefore described, the adjusting rod assembly 180 is pivoted in a clockwise direction generally to the dotted line position shown at 180' in FIG. 2 after which said pivot frame is pivotable in a counterclockwise direction for raising the upper scoring blade assembly and for complete removal of said assembly and the pivot frame.

An endless conveyor belt 200 is provided for conveying meat patties P from the forward, receiving end of the main frame 10 through the scoring blades to the rearward end of said main frame. At the forward end of said main frame, the belt 200 passes around an idler shaft 201 which carries a plurality of belt guide collars 202. Moving in a forward direction, the belt 200 passes over a pair of belt support rods 203 which are disposed parallel with and spaced inwardly from the side frame members 11 and 12 and which are welded to the end tie rod 13 and the intermediate tie rod 15. The belt 200 then passes downwardly over a belt guide shaft 204 at which point it reverses its curvature and moves around the belt guide rollers 57 of the lower scoring blade assembly 30. From the belt guide rollers 57, the belt passes upwardly over a second belt guide shaft 205 and resumes its horizontal movement in a rearward direction slightly below the level of said belt on the forward end of the main frame 10. It will be noted in FIG. 8 that stripper plate 102 is approximately at the same horizontal level as the conveyor belt 200 forward of belt guide shaft 204 and rearwardly of guide shaft 205. The rearward end of said main frame carries an idler shaft 206 having belt guide collars 207 around which the belt passes before it doubles back to a belt guide shaft 208 carried between the auxiliary frame members 17 and 18. The guide shaft 208 is disposed rearwardly of the bearing recesses 21 and 22. Forwardly of said bearing recesses 21 and 22 there is provided the belt drive shaft 86 which carries the belt drive sprockets 93. From beneath the sprockets and the belt drive shaft, the belt 200 passes upwardly over a belt guide shaft 211, disposed below the belt support rod 203, from which the belt returns to the idler shaft 201. Referring for the moment to FIG. 7, as hereinbefore disclosed, the belt drive shaft 86 carries the belt drive pinion 94 whereby upon rotation of the motor, the belt is caused to move along the path just described.

As best seen in FIG. 4, the belt 200 comprises a multiplicity of links 214 each of which is formed from a length of steel wire. Each link 214 is formed to provide a dovetail shaped middle portion 215 flanked on either side by symmetrically formed, reversed dovetail side portions 216, with the extreme lateral ends of each link being again reversed to form hooks 217. The links 214 are connected together by each said link having its middle dovetail portion 215 threaded through the middle dovetail portion of the adjacent link in one direction while at the same time its flanking, reversed dovetail side portions 216 similarly receive the side portions of said adjacent link. The middle portions 215 of the links span the distance between the belt drive sprockets 93 and extend laterally therebeyond to points inwardly of the inner belt guide collars 92. The teeth of the sprockets 93 engage between the links 214 for driving the belt 200. The hooks 217 are disposed laterally outwardly of the outer belt guide collars 91 and are in alignment with the belt guide rollers 57 of the lower scoring blade assembly 30.

In operation of the meat scoring machine of this invention, the meat patties P are placed upon the belt 200 adjacent to the forward end of the main frame 10. This may be done by hand or by an automatic, patty-making machine of a known type. When used in connection with an automatic, patty-making machine, the meat scoring machine of the present invention is preferably attached directly to the patty-making machine, means for such attachment being generally indicated at 220 in FIG. 1. The meat patties P are moved by the belt 200 in the direction of the arrow X in FIG. 3 from the forward end of the main frame 10 to the rearward end thereof. As they approach the scoring blade assemblies 30 and 31, a portion of each meat patty P is engaged by the scoring teeth 64 and 80 before the remainder of the patty leaves the belt 200 at the belt guide shaft 204; similarly, as each patty leaves the scoring blade assemblies, a portion thereof is disposed once again on the belt 200 before the last of the patty leaves the scoring teeth. Thus, uninterrupted motion of the patties from the forward to the rearward end of the scoring machine is assured. As each patty P moves between the scoring blade assemblies, it receives a multiplicity of nonperforating indentations on both surfaces from the scoring teeth with no two indentations being in vertical alignment with each other.

It is advantageous if the peripheral speed of the scoring teeth is slightly faster, preferably about 2%–4%, than the speed of the conveyor belt. The reason for this is that the belt has a tendency to pull on the meat when it is impaled by the knives thereby elongating the meat patty. The faster the belt goes in relation to the scoring teeth, the more there is an elongation of the meat patty P. However, it will be readily appreciated that if it is desired to elongate the meat patty, this may be effected by deliberately increased the speed of the belt in relation to the scoring blade assemblies until the desired amount of elongation is accomplished.

The depth of the indentations of the scoring teeth is variable by adjusting the rearwardly directed end of the pivot frame 32 upwardly by means of the adjusting rod assembly 180 in the manner hereinbefore described. This adjustment which effects the height of the upper scoring blade assembly 31 can be used to control the depth of the identations both at the top and the bottom surfaces of the meat patty without the need for adjusting the lower scoring blade assembly 30. This is possible because a meat patty, in passing over the scoring teeth of the lower scoring blade assembly, naturally tends to ride up and over the lower blades with very little penetration thereof in the absence of some pressure on the top of the patty. In other words, because of the multiplicity and close spacing of the scoring teeth 64 of the lower scoring blade assembly 30, a meat patty passing over only the lower scoring blade assembly would simply arch upwardly, riding upon the tips of the scoring teeth 64, and thus pass over said lower scoring blade assembly with only a very shallow penetration of said scoring teeth. However, the scoring teeth 80 of the upper scoring blade assembly 31 tend to press the meat patty downwardly, the upward and downward pressures of the two scoring blade assemblies tending to offset each other with the result that substantially uniform depth of penetration is effected on both sides of the patty.

Referring now to FIGS. 10 and 11, when it is desired to score only the upper surfaces of meat patties moving along the conveyor belt 200, an alternate arrangement of the parts is made. First, the lower scoring blade assembly 30 and the idler gear shaft assembly 110 are removed from the bearing recesses 25, 26 and 21, 22 respectively. This is effected by manipulation of the retainer clips 111 and 112 in the manner hereinabove fully described. The idler gear shaft assembly 110 is then moved to the former position of the lower scoring blade assembly 30 at the same time being reversed end-for-end whereby the idler gear 116 is disposed beyond the side frame member 12 in line with the other gears in the gear train. This makes the gear train as illustrated in FIG. 7 complete by replacing the gear 63 with the idler gear 116, said idler gear being of the same size as the gear 63. At the same time, the lower scoring blade assembly 30 is disposed within the lower bearing recesses 21 and 22, at the same time also being reversed end-for-end whereby the gear 63 of said lower scoring blade assembly is disposed on the opposite side of the main frame 10 beyond the side frame member 11 where it will not interfere with the gear train. The conveyor belt 200 now passes straight underneath the upper scoring blade assembly 31 but is arched upwardly over the belt guide rollers 57 of the lower scoring blade assembly 30 between the belt drive shaft 86 and the belt guide shaft 208. Thus, the slack left by straightening out the conveyor belt beneath the upper scoring blade assembly 31 is taken up therebelow by the belt guide rollers 57 of the lower scoring blade assembly.

As shown in FIG. 11, the lower stripper plate 102 is replaced by a plain backing plate 222 having the same outer contour as said stripper plate including end tabs 223 of the same dimension as the end tabs 105. Means are provided for preventing an upward curling or bowing of the edges of the belt as it passes over the backing plate 222 to assure that the patty P lies perfectly flat as it is being scored from the top by the upper scoring assembly 31. This means comprises belt guides 225, detailed in FIGS. 12 and 13, which comprise strips of plastic or the like having inwardly turned flanges 226 at the ends thereof adapted to slide over and grasp the longer edges of the backing plate 222. The belt guides are disposed parallel with the direction of movement of the conveyor belt and are disposed adjacent to the side edges of said conveyor belt. Each belt guide has an inwardly projecting lip 227 along its inner, longer edge which overlies the adjacent edge of the belt 200 to hold it flat in the area of the upper scoring blade assembly 31.

Each patty P to be scored at the top surface only is placed upon a piece of paper 230 and propelled under the upper scoring blade assembly 31 where it is scored by the scoring teeth 80 (FIG. 10). Each meat patty rides continuously upon the conveyor belt which passes above the backing plate 222, and no problem of elongating of the patty occurs because the paper 230 does not afford sufficient friction on the conveyor belt to tend to cause such elongation.

It will be understood that many changes in details of the invention as herein described and illustrated may be made without, however, departing from the spirit thereof or the scope of the appended claims.

What is claimed is:

1. An apparatus for scoring a meat patty or the like comprising conveyor means for moving the patty along a path; upper and lower scoring means disposed respectively above and below said path at one point along said path for scoring the patty as it passes said scoring means; each said scoring means comprising a transversely directed arbor; a plurality of generally circular scoring blades carried by each said arbor and spaced axially therealong; each scoring blade having a plurality of generally radiating teeth spaced around the circumference of said blade; each said tooth having a substantially radially disposed back edge and an outwardly tapering front edge; a horizontally disposed stripper plate having slots through which the teeth of the blades of the lower scoring means extend upwardly; said conveyor means having horizontal runs both forward and rearward of said plate at approximately the horizontal level of said plate; the scoring blades of each said scoring means being so oriented that said front edges first contact the patty; and power means rotating said scoring means and moving said conveyor means whereby the circumferences of said scoring means and said conveyor means move in the same direction and whereby said teeth are successively projected into the patty at both the top and bottom thereof with a drawing and slicing motion; said horizontal runs of said conveyor belt and said stripper plate and said scoring means being so positioned and arranged that a portion of each meat patty is engaged by the scoring teeth before the remainder of the patty leaves the conveyor means at the entering side and a portion of each meat patty is disposed on the discharge run of the conveyor means before the last portion of the patty leaves the scoring teeth.

2. An apparatus as set forth in claim 1; said teeth of said upper and lower scoring means being vertically overlapped; said scoring blades being so spaced along each said arbor that each said scoring blade projects between and is spaced from adjacent pairs of scoring blades of the other scoring means.

3. An apparatus as set forth in claim 2; said teeth being uniformly spaced around the circumference of each said scoring blade; the teeth of any two adjacent scoring blades of either of said scoring means being angularly displaced with respect to each other substantially one-half the angular distance between adjacent teeth on the same scoring blade.

4. An apparatus as set forth in claim 3; each said scoring means having stripper means associated therewith; each said stripper means comprising a plate having means defining slots therein for receiving said scoring blades; said plates being disposed between said arbors and being vertically spaced from each other and defining the normal thickness of the patty; said teeth projecting upwardly and downwardly beyond said plates only sufficiently to provide nonperforating indentations in the patty.

5. An apparatus for optionally scoring a meat patty or the like on both the to and bottom or on the top only, said apparatus comprising a conveyor for moving the patty along a path; said conveyor comprising an endless belt defining said path and a return path; a main frame supporting said belt; and main frame providing a first releasable shaft mounting means adjacent to said path and a second releasable shaft mounting means adjacent to said return path; an upper frame disposed above said main frame; an upper scoring means carried by said upper frame above said path for scoring the top of the patty; a lower scoring means disposed below said upper scoring means for scoring the bottom of the patty; each said scoring means comprising an arbor carrying a plurality of rotary, toothed scoring blades with the arbor of said lower scoring means being normally disposed within said first shaft mounting means; the arbor of said lower scoring means carrying belt guide rollers having a greater diameter than said blade; first belt guide means carried by said main frame on either side of said first shaft mounting means; second belt guide means carried by said main frame on either side of said second shaft mounting means; said belt passing over said first belt guide means and being diverted from said path beneath said belt guide rollers when said arbor of said lower scoring means is disposed in said first shaft mounting means whereby the patty is caused to leave said belt, pass between said scoring means, and return to said belt on the other side of said scoring means; said lower scoring means being transferable whereby its arbor is disposed in said second shaft mounting means with said belt passing under said second belt guide means and over the top of said belt guide rollers when said apparatus is adapted for scoring only the top of the patty.

6. An apparatus as set forth in claim 5; the arbor of said lower scoring means carrying a first driven gear at one end thereof; gear train drive means for rotating said scoring means and driving said belt including a drive gear meshing with said first driven gear when the arbor of said lower scoring means is disposed within said first shaft mounting means; an idler shaft normally disposed within said second shaft mounting means; a second driven gear carried by one end of said idler shaft; said idler shaft being transferred from said second shaft mounting means to said first shaft mounting means when the arbor of said lower scoring means is transferred to said second shaft mounting means whereby said second driven gear replaces said first driven gear in said gear train drive means.

7. An apparatus for scoring a meat patty or the like comprising a pair of laterally spaced, elongated side members; means rigidly fixing said side members with respect to each other; conveyor belt guide means carried by said side members; a conveyor belt engaging said guide means and having a portion thereof defining a path along which the party moves; a scoring means mounted between said side members below the level of said path; said scoring means comprising an arbor; a plurality of rotary scoring blades carried by said arbor and projecting above said path; each said side member having a bearing recess formed in its upper edge and means providing a shallower, clearance recess connected therewith and longitudinally displaced from said bearing recess; each said bearing recess adapted to receive one end of said arbor; a retainer clip mounted to each said side member; said retainer clip having a body portion disposed flatwise against the outer side of the side member and a lip overlying the upper edge of the side member; a lug projecting downwardly from said body portion and having an inwardly turned foot portion overlying and retaining an end of said arbor in said bearing recess; means providing a pair of notches in said body portion, said notches opening horizontally in the same direction and disposed on either side of said lug; notch engaging means carried by the associated side member and including a securing bolt associated with one of said notches; means providing an L-shaped slot having a horizontal portion of such length that said clip can be moved horizontally to disengage said notches from said notch engaging means and move said lug from said bearing recess into said clearance recess; said L-shaped slot means including a vertical portion allowing upward movement of said clip after said notches are disengaged; a headed pin carried by the associated side member and projecting through said slot; said clip being pivotal about said headed pin, in the raised position, to allow removal of the associated end of said arbor; said L-shaped slot being of such width at its horizontal and vertical portions as to be captively engaged by said head and of sufficient width at the intersection of said portions to allow said headed pin to pass therethrough.

8. An apparatus for scoring a meat patty or the like comprising a frame and a conveyor carried thereby for removing the patty along a path, scoring means disposed above said conveyor at one point along said path for scoring the patty as it passe under said scoring means; said scoring means comprising a transversely directed arbor; a plurality of rotary scoring blades carried by said arbor and spaced axially therealong; a pivoted mounting means carrying said scoring means; said mounting means comprising a pair of spaced, parllel, horizontal arms spaced above and toward either side of said conveyor; means rigidly connecting said horizontal arms to each other; said arbor pivotally mounted between said horizontal arms intermediate the ends of said arms; said mounting means having vertical arms projecting downwardly from like directed ends of said horizontal arms; means pivotally mounting the lower ends of said vertical arms to said frame on a transverse axis; an adjusting rod mounted to said frame and disposed adjacent to the distal end portion of one of said horizontal arms; means pivotally mounting said rod on a transverse axis to said frame adjacent to the lower end of said rod whereby the upper end portion of said rod is pivotal upwardly adjacent to said distal end portion; said distal end portion and said rod having coacting, detachable engaging means whereby said rod is pivotal upwardly to hold said mounting means and said scoring means in a predetermined position above said conveyor.

9. An apparatus as set forth in claim 8; said engaging means comprising a clip carried by said distal end portion having a laterally offset end portion embracing said rod in its upwardly pivoted position; said rod carrying a pair of loosely fitting disk members; a spacer disposed between said members and normally holding said members apart a distance less than the normal vertical dimension of said distal end and said clip; stop means carried by said rod preventing movement of one of said disk members away from said spacer; spring means carried by said rod and biasing the other said disk member toward said one disk member and said spacer; said distal end of said one horizontal arm and said clip being tapered to enter easily between said disk members; said rod being pivotal to a position whereby the normal dimension of said one horizontal arm and said clip is disposed between said disk members and resiliently held thereby.

10. An apparatus as set forth in claim 9; said rod being threaded; said stop means comprising a threaded member which is vertically adjustable along said rod; said one disk member being disposed adjacent to said stop means and being the lowermost of said disk members; said spring means being disposed above the other said disk member whereby said mounting means is resiliently held against pivoting upwardly.

11. An apparatus as set forth in claim 8; said frame comprising a pair of parallel, spaced side members; said vertical arms downwardly overlapping the outer sides of said side members; said means pivotally mounting the lower ends of said vertical arms comprising a transversely directed pivot shaft extending between said side members and being slidably mounted in said side members for movement in the direction of its axis; said pivot shaft having detent means for indicating two longitudinally displaced positions of said pivot shaft; said pivot shaft havng diametrically reduced portions disposed adjacent to said side members; means defining apertures in the lower ends of said vertical arms with the normal diameter of said pivot shaft being slidably fitted therein; means defining notches in the lower ends of said vertical arms, said notches intersecting said apertures and being large enough for said reduced portions to pass therethrough; and means for longitudinally displacing said pivot shaft between one of said positions, wherein the normal diameter of said pivot shaft is disposed in said apertures for pivotally mounting said mounting means, and the other of said positions, wherein said reduced portions are aligned with said apertures and said notches whereby said mounting means is removable from said frame.

12. A scoring blade for a meat scoring machine comprising a generally circular blade portion; said blade portion having axially extending hubs molded thereto and extending in either axial direction on either side of said blade portion; means defining an aperture through said blade portion; said hubs integrally connected to each other and locked to said blade portion by a part of the material from which said hubs are molded extending through said aperture.

13. A scoring blade for a meat scoring machine comprising a generally circular blade portion; means defining a central circular aperture through said blade portion; means defining a plurality of smaller apertures through said blade portion circumferentially spaced around said central aperture and spaced radially outwardly therefrom; said blade portion carrying axially extending hubs molded thereto and extending in either axial direction on either side of said blade portion; said hubs formed of plastic and integrally connected to each other and locked to said blade portion by a part of said plastic extending through said central aperture and through said smaller apertures, and said hubs having a central aperture of less diameter than said blade portion aperture and concentric with the latter, whereby said plastic encases the edge of said blade portion aperture.

14. A scoring blade as set forth in claim 13; said blade portion having a plurality of generally radiating teeth spaced around the circumference of said blade; each said tooth having a substantially radially disposed back edge and an outwardly tapering front edge which first contacts a meat product in use of said scoring blade.

References Cited by the Examiner
UNITED STATES PATENTS

| | | | |
|---|---|---|---|
| 1,011,444 | 12/1911 | Kihlgren et al. | 198—193 |
| 2,287,278 | 6/1942 | Spang | 17—25 |
| 2,409,463 | 10/1946 | Ahrndt | 17—26 |
| 2,518,562 | 8/1950 | Moree et al. | 17—26 |
| 2,737,684 | 3/1956 | Spang | 17—26 |

SAMUEL KOREN, *Primary Examiner.*

LUCIE H. LAUDENSLAGER, *Examiner.*